Jan. 16, 1923.
W. A. FRAMENT.
ARTIFICIAL BAIT.
FILED AUG. 10, 1921.
1,442,332.
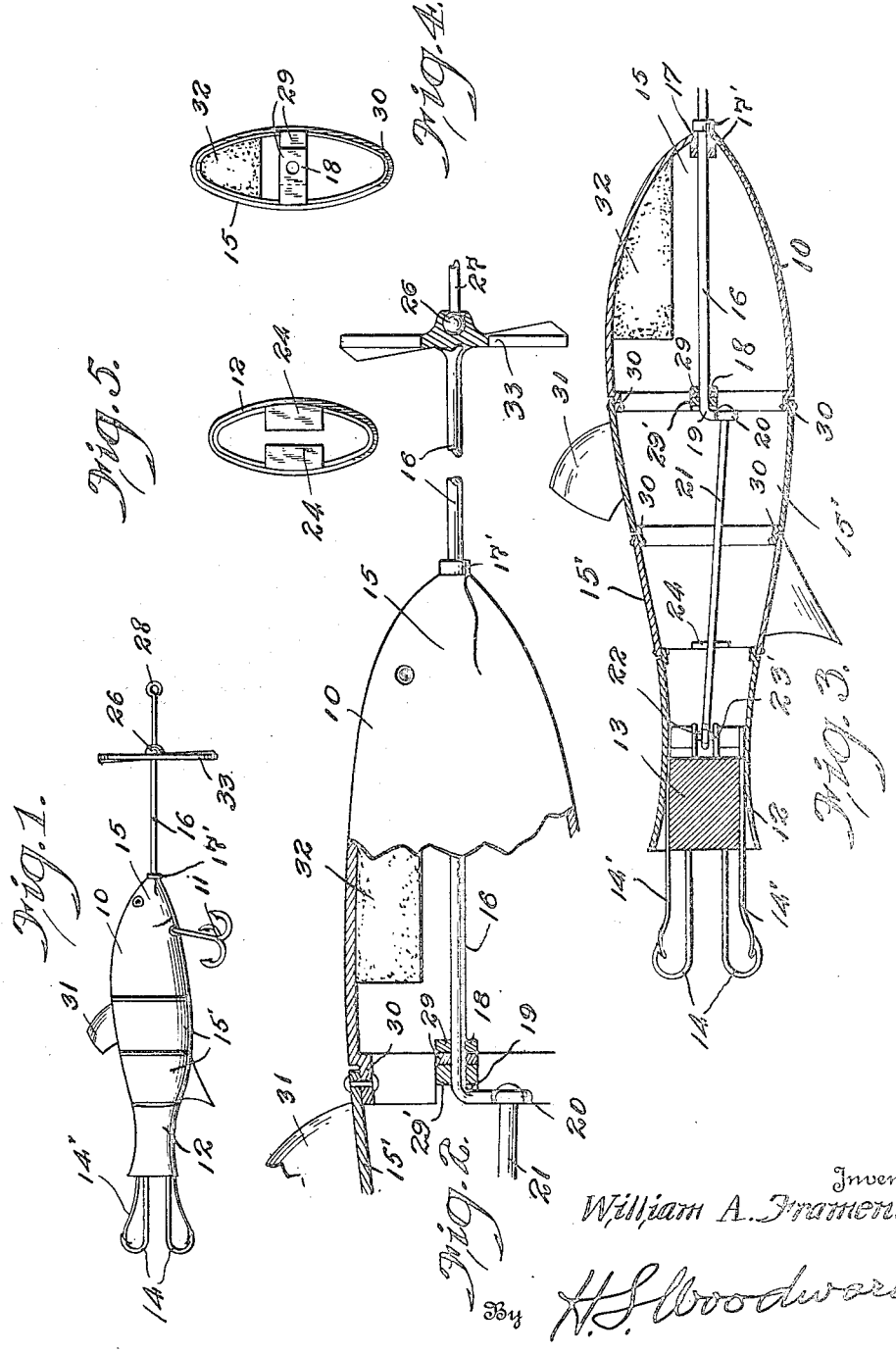
Inventor
William A. Frament,
By H. S. Woodward,
Attorney Patented Jan. 16, 1923.

1,442,332

UNITED STATES PATENT OFFICE.

WILLIAM A. FRAMENT, OF COHOES, NEW YORK.

ARTIFICIAL BAIT.

Application filed August 10, 1921. Serial No. 491,206.

*To all whom it may concern:*

Be it known that I, WILLIAM A. FRAMENT, a citizen of the United States, residing at Cohoes, in the county of Albany and State of New York, have invented certain new and useful Improvements in Artificial Bait, of which the following is a specification.

This invention relates to artificial bait, especially that used in trolling. It is a special aim of my invention to provide a bait in the form of a minnow, although other shapes and forms may be found desirable, and to give a motion to the bait to resemble as nearly as possible that of a live organism. A further object of the invention is to provide a device of this character which may be readily formed of sheet metal and bent into proper shape. It is also an object to provide a device of this character having few working parts.

Additional objects, advantages and features of invention may appear in the structural form, combination or arrangement of parts to be understood from the following description, and from the drawings, in which, Figure 1 is a side elevation of my bait.

Figure 2 is an enlarged fragmentary sectional view thereof.

Figure 3 is an enlarged detail of the operating means.

Figure 4 is a rear elevation of the forward part of the bait, showing the manner of forming the bearing for the operating shaft.

Figure 5 is a front elevation of the tail section 12 of the bait.

There is illustrated a bait 10, in the present instance in the form of a minnow, carrying near its forward end a swivelled multiple hook 11, and at the rear of the tail portion 12 there are secured in a plug 13 hooks 14, extending rearwardly in a plane with the tail. Also mounted in the plug 13 there are respective leaf springs 14', very light and having their outer ends laid against the inner sides of the hooks between the barbs and the points. The springs have been made of watch springs. The bait is made up of a head section 15 and intermediate sections 15' formed in suitable shape from sheet metal, all pivotally connected. Extending centrally through the forward or head part of the minnow, there is a shaft 16, supported revolubly in bearings 17 and 18 at the front and rear of the head section 15 respectively, collars 17' being secured upon the shaft 16 inwardly and outwardly of the bearing 17. The shaft 16 is bent at right angles at the rear part, to form a crank 19, and has thereon an eyelet 20 in a plane at right angles to the shaft. Revolubly mounted in the eyelet 20 there is the headed end of a second shaft 21, extending rearwardly and secured by means of a loose connection 22 to a vertical pin 23 on the plug 13. The plug 13 is held rigidly in the tail portion 12, for purposes which will be described.

The pin twenty-three is located to the rear of the pivotal connection between the tail section and the next adjacent intermediate section 15', and is mounted in ears 23' on the forward end of the plug 13. The pin may also be utilized to secure the forward end of the springs 14' as indicated. Flanges 24 are turned in from the forward edges of the tail section 12 having vertical parallel edges between which the shaft 21 is fitted so that it may oscillate freely up and down, but on lateral movement of the forward end of the shaft 21 by means of the crank said shaft will bear against the flanges 24 so as to oscillate the tail.

The swivel 26 connects the main shaft 16 with a line shaft 27 having an eye 28 therein to which the fishing line may be connected.

The mounting or bearing 18 of the shaft 16 in the rear head portion of the fish consists of two ears 29 turned in from respective sides of the head section at its rear edges. These are overlapped and perforated to receive loosely the shaft 16.

The pivotal connections between the body sections of the fish consist in each instance of ears 30 formed on the respective rear edges, at top and bottom extended within the adjacent section, and loosely pivoted thereon in any suitable manner.

In operation, the bait being attached by the eye to a line, and upon being drawn through the water, a revolving motion will be imparted by the propeller like blades 33, to the shaft 16. The consequent movement of the crank will oscillate the shaft 21 causing pivotal movement of the tail section. The water impinging against the tail will cause the bait to move first to one side and then the other, carrying the sections 15' with it, a sinuous motion resulting, closely resembling the natural action of a fish when swimming.

A fin 31 may be provided on one or more of the body sections if desired, formed so as to tend to rotate the body in a direction opposite that in which the shaft 16 rotates, but with only sufficient force to offset the friction of the shaft tending to rotate the body of the fish. A small piece of cork 32 or any other buoyant element secured at the upper part of the head section may also be utilized for retarding rotation of the bait body and to improve the trolling action of the bait.

A bearing collar 29' may be provided on the shaft 16 immediately adjacent the crank 19, enabling the latter, when rotating, to clear the ears 29.

What is claimed is:

1. A bait of the character described comprising a head section, a tail section and intermediate connections all connected in train pivotally for sinuous movements as a whole, a shaft revoluble on an axis fixed with respect to the head and having a crank at its rear end formed with an eye tranversely of the bait, a second shaft having a univeral pivot connection with the tail section rearwardly of the connection of the tail and adjacent body section, said shaft having its forward portion inserted through the said eye, and means forwardly of the universal pivot connection within the bait to limit lateral oscillaton of the second shaft at an intermediate point on that shaft, with respect to adjacent bait section parts.

2. A bait of the character described comprising a plurality of hollow sheet metal sections connected in train and in the form of a fish, a shaft inserted through the head section revolubly, said head section having overlapped ears apertured and receiving the shaft as bearings, the shaft being of wire, bent at right angles rearwardly of the bearings and formed with an eye transversely of the bait, a second shaft universally pivoted upon the tail section rearwardly of the pivotal connection between the tail section and next adjacent section, said second shaft having its forward part inserted through said eye, edge portions of a bait section being extended, bent inwardly and formed with parallel opposed edges to confine the intermediate part of the second shaft to vertical movement therebetween, for the purposes described.

In testimony whereof I have affixed my signature in presence of two witnesses.

WILLIAM A. FRAMENT.

Witnesses:
EDGAR W. ASHLINE,
CHARLES FRAMENT.